Oct. 15, 1963 N. G. E. STEMME 3,106,889

POSITIONING DEVICE FOR PRINTING TYPE CHARACTERS

Filed Nov. 29, 1960 3 Sheets-Sheet 1

INVENTOR.
NILS GUSTAF ERIK STEMME
BY Hane and Nydick
ATTORNEYS

POSITIONING DEVICE FOR PRINTING TYPE CHARACTERS

Filed Nov. 29, 1960 3 Sheets-Sheet 2

INVENTOR
NILS GUSTAF ERIK STEMME
BY Hane and Nydick
ATTORNEYS

Oct. 15, 1963 N. G. E. STEMME 3,106,889

POSITIONING DEVICE FOR PRINTING TYPE CHARACTERS

Filed Nov. 29, 1960 3 Sheets-Sheet 3

INVENTOR.
NILS GUSTAF ERIK STEMME
BY Hane and Nydick
ATTORNEYS

United States Patent Office 3,106,889

Patented Oct. 15, 1963

3,106,889

POSITIONING DEVICE FOR PRINTING TYPE CHARACTERS

Nils Gustaf Erik Stemme, Nasbypark, Sweden, assignor to Aktiebolaget Atvidabergs Industrier, Atvidaberg, Sweden, a joint-stock company of Sweden Filed Nov. 29, 1960, Ser. No. 72,401
Claims priority, application Sweden Dec. 2, 1959
3 Claims. (Cl. 101—93)

The present invention relates to a device for printing data stored in electronic registers particularly for use in electronic desk calculators and similar devices.

In electronic computers of the kind where data, for example the result of a calculation, stored in a register, are printed with the aid of mechanical printers the printing time will generally determine the computing speed which can be obtained. Therefore, it is important that the printer is so designed and is caused to cooperate with the register in such a manner that the printing time is reduced to a minimum. Simultaneously the number of electronic components required for each digit position should be as small as possible.

The present invention relates to a device for printing data stored in an electronic register, which device enables data to be printed with comparatively few components per digit position. The device according to the invention for printing characters stored in an electronic register having one register position for each character position to be printed with the aid of type carriers individual to each character position is characterized therein that the register positions are sequentially fed with pulses for changing the contents of the register positions one unit at a time in either direction, that the type carriers corresponding to the register positions where the contents can be changed one unit without exceeding the capacity of said register position are caused to be engaged by a periodically operating stepping device and are shifted one type division, said stepping device starting a new cycle for changing the contents of the register positions with a further unit at the end of each stroke, said type carriers being caused to perform a printing operation when the contents of all the register positions are cleared and the type carriers are set in the position corresponding to the contents of the respective registers.

The invention will be described more in detail in connection to the enclosed drawings where FIG. 1 shows the design of a printer according to the invention.

Figure 1:
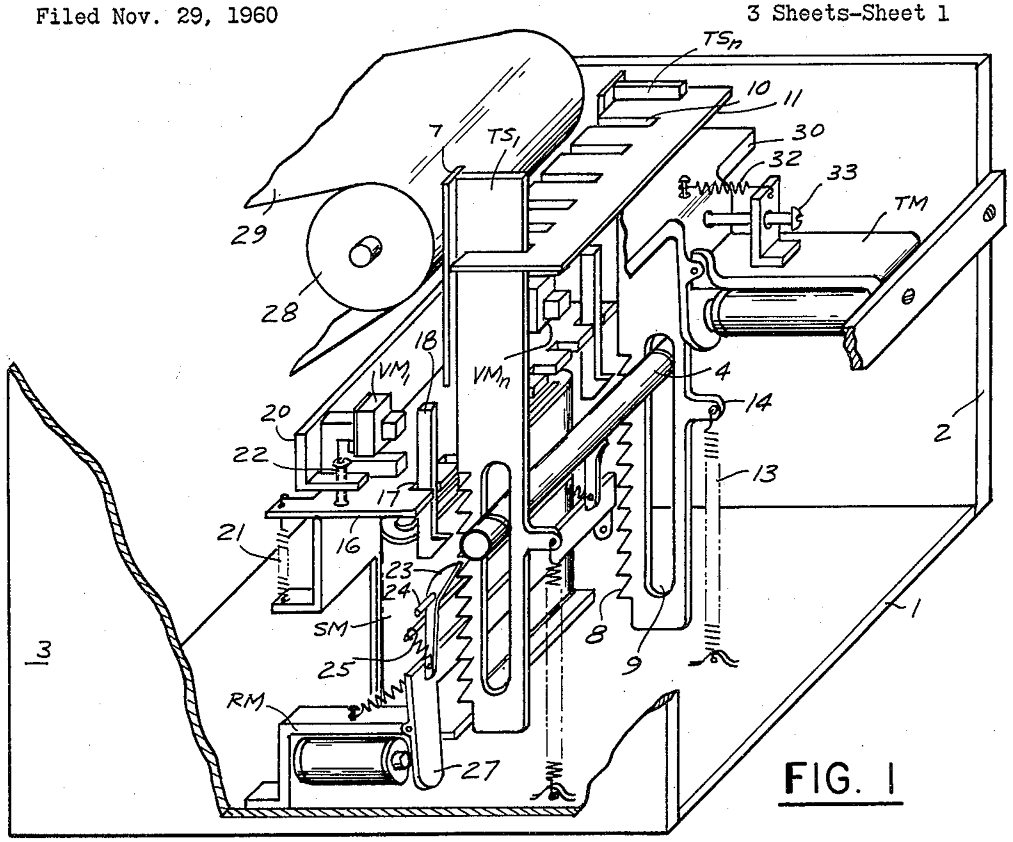

FIG. 1 shows in principle a printer according to the invention. The printer, which is mounted in a frame consisting of a base plate 1 and side plates 2 and 3, is provided with the same number of type bars as the greatest number of characters to be printed on one line. In the figure only two type bars TS1 and TS$n$ are shown. Each type bar is provided with a type plate 7 which is provided with the same number of types as the number of different characters, usually the digits 0–9. The lower part of each type bar is provided with teeth 8, having a mutual distance corresponding to the space between the types on the type plate, and a slot 9. The type bars are supported by a fixed pivot 4 extending between the side plates and through the slots of all the type bars. The type bars slide in the grooves 10 of a guide 11 and are normally kept in a retracted position in the grooves by springs 13 which are arranged between a projection 14 on the type bar and the base plate 1.

A stepping magnet SM which is attached to the base plate 1 is used for selecting the desired type on the typebars. The stepping magnet SM which is extending along all the type bars is provided with an armature 16 having a notch 17 opposite to each type bar. A pawl 18 is rockably mounted in each notch in such a manner that it can be caused to engage the teeth of the pertaining type bar. The upper part of the pawl 18 is shaped as an armature of a magnet VM1—VM$n$ of which only two VM1 and VM$n$ are shown in the figure. All the magnets VM1—VM$n$ pertaining to the pawls of the different type bars are mounted on a rack 20 which is mounted between the side plates 2 and 3. The magnets VM1—VM$n$ are made of a material having a slight remanence so that the pawl 18, when energized, remains in the engaging position until it is disengaged by the teeth of the pertaining type bar when the armature 16 is moving downwards. The motion of the pawl 18 is limited in such a manner that it cannot contact the pole-piece of the magnet and thus brake the armature 16. The armature 16 is loaded by a helical spring 21 and the motion thereof can be set by means of a screw 22 so that it coincides with the type spacing of the type bars TS1—TS$n$. Each type bar is provided with a detent 23. The detents of the different type bars are rockably mounted on a common shaft 24 and they are normally kept in engagement with the teeth of the type bars by means of springs 25. An electromagnet RM has an armature 27 which is extending along all the detents in such a manner that all said detents can be simultaneously disengaged when the armature is engaged. The type bars are caused to strike the paper 29 running over a platen 28 by an electromagnetically operated hammer 30. This hammer is the armature of an electromagnet TM mounted on a bar extending between the sideplates 2 and 3. The hammer is normally kept in its retracted position by a spring 32 and the stroke can be controlled by a set screw 33. A carbon ribbon is normally running between the type bars and the paper but it is not shown in the figure.

Figure 2:
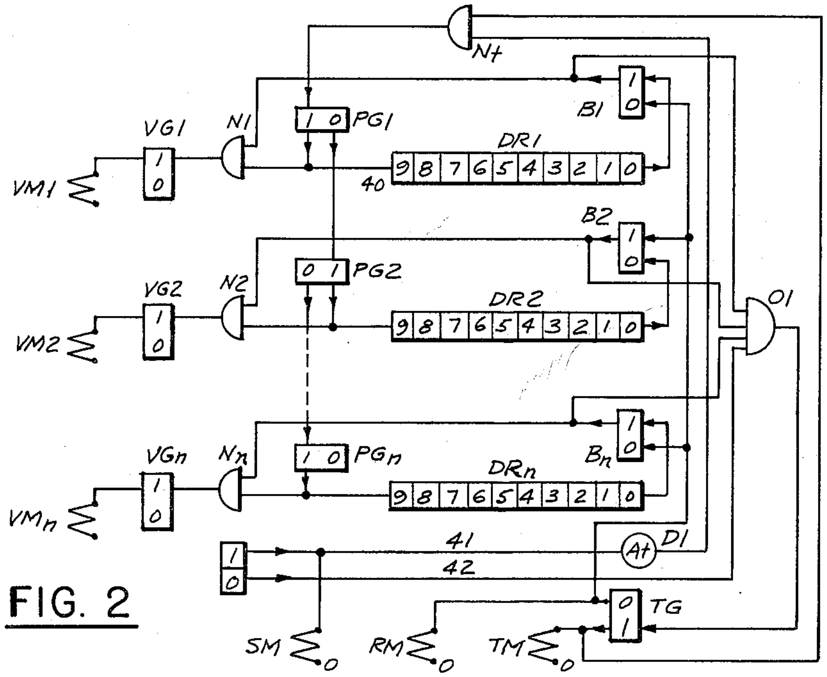
FIG. 2 shows the electrical circuits required for controlling the printer.

FIG. 2 shows the electronic equipment used for controlling the operation of the printer. The digits to be printed are stored in a number of decimal registers DR1, DR2 . . . DR$n$. The decimal registers are suitably of the shift register type and they are preferably built up of magnetic elements. Each decimal register is provided with a pulse generator PG1—PG$n$, preferably a blocking-oscillator, a bistable flip-flop B1—B$n$ and an inhibitor circuit N1—N$n$. In addition there is a number of pulse generators VG1—VG$n$ each feeding a selector magnet VM1—VM$n$, a self oscillating pulse generator SG feeding the stepping magnet SM and a printing pulse generator TG which partly feeds the printing magnet TM, partly feeds the reset magnet at the end of the printing pulse. The pulse generator SG is connected to the trigger input of the pulse generator PG1 of the first decimal register through the delay circuit D1 and the inhibitor circuit N$t$. The pulse generators PG1—PG$n$ generate reset pulses to the decimal registers and trigger pulses to the pulse generators VG1—VG$n$ via the inhibitor circuits N1—N$n$. The pulse generators PG1—PG($n$—1) are also provided with a second output which is connected to the trigger input of the pulse generator PG2—PG$n$ of the following decimal register and said second output delivers a pulse which is derived from the overshoot obtained at the trailing edge of the pulse of a blocking oscillator. As soon as a decimal register is stepped one step backwards and the pertaining pulse generator VG1—VG$n$ is started, the next pulse generator PG1—PG$n$ is started and so on until the last decimal register is actuated.

The last stage of the decimal register (0) is so connected to the pertaining flip-flop B1—B$n$ that the latter is set as soon as the decimal register is completely cleared. This causes the pertaining inhibitor circuit N1—N$n$ to be closed and one of the inputs of the and-circuit 01 is conditioned. A further input of the and-circuit 01 is connected to the pulse generator SG and the pulse obtained at the trailing edge of the pulse generator can only pass the and-circuit 01 if all the decimal registers are zero set. The output of the and-circuit 01 is connected to the trigger input of the pulse generator TG. The output of the pulse generator is connected as well to the print magnet TN as to the inhibit input of the inhibit circuit N$t$. When the pulse generator TG is reset a pulse is generated which is actuating the magnet RM and zero setting the flip-flops B1—B$n$.

In the following a printing operation will be described under the assumption that digits are stored in all the $n$ registers. The printing operation is started by means of depressing the start key K at the time $t0$. The stepping pulse generator SG which in effect is a multivibrator is then started and the stepping magnet SM is energized simultaneously as a pulse is sent to the pulse generator PG1 through the conductor 41, the delay circuit D1 and the inhibit circuit N$t$. The delay time of D1 is so selected that the pulse generator PG1 does not start before the time $t1$ when the stepping-magnet SM has been energized. The armature 16 with the pawls 18 is then in its lower position. The pulse generator PG1 is generating a short pulse which partly steps the decimal counter DR1 one step backwards, for example from 3 to 2, and on the other hand starts the pulse generator VG1. The latter is energizing the selector magnet VM1 and the pertaining pawl 18 is moved into engagement with the first tooth of the type bar TB1. During the time the selector magnet VM1 is still energized the trailing edge of the pulse generator PG1 has started the pulse generator PG2 which in the same manner is decreasing the contents of the decimal register DR2, for example 1, with one unit and triggers the pulse generator VG2 and starts the next pulse generator PG etc. All the pulse generators PG1—PG$n$ operate in rapid sequence during the time $t1$—$t3$ which is short compared with the pulse time $t0$—$t4$ of SG. At a time $t4$ the pulse SG ceases and the armature 16 is released and moves upwards under the action of the spring 21. All the pawls 16 which are operated by the magnets VM1—VM$n$ move the pertaining type bar one step and the detent 23 keeps the type bar in this position. After a time $t5$—$t4$ which is sufficient to permit the armature 16 to release the multivibrator FG starts a new cycle causing the stepping magnet SM to be energized again and the pulse generators to operate one after the other for decreasing the contents of the decimal registers by one unit. Suppose that the decimal register DR$n$ originally contained zero so that it is completely empty when the second pulse generator PG$n$ generates its second reset pulse. When the digit zero was removed from the decimal register DR$n$ a pulse was generated which triggered the bistable flip-flop B$n$ to its active position and thus further transfer of the pulses from the pulses generator PG$n$ to the selector magnet VM$n$ is prevented by the inhibitor circuits N$n$. When the armature is returning to its upper position after the end of the stepping pulse at the time $t6$ the type bar TS$n$ will not follow the armature but it remains in the position where the 0-type is opposite to the platen. In this manner the decimal counters are stepped backwards until they are all cleared and all the type bars have obtained the positions corresponding to the original contents of the decimal registers. All the bistable flip-flops B1 are then in their operative position and thus the and-circuit 01 will open when the stepping pulse generator SG feeds the pulse to the conductor 42 at the time $t8$. The printing pulse generator TG is started and it sends a pulse to the printing magnet TM during the time $t9$ to $t10$ and the printing hammer 30 makes a stroke and prints the number set up on the type bars on the paper 29. At the trailing edge of the printing pulse the flip-flops B1—B$n$ are reset and the magnet RM is energized causing the armature 27 to release all the detents 23 and the type bars return to their lower position under the action of the gravity and the springs 13. The printer is now ready for a new printing operation.

Figure 3:
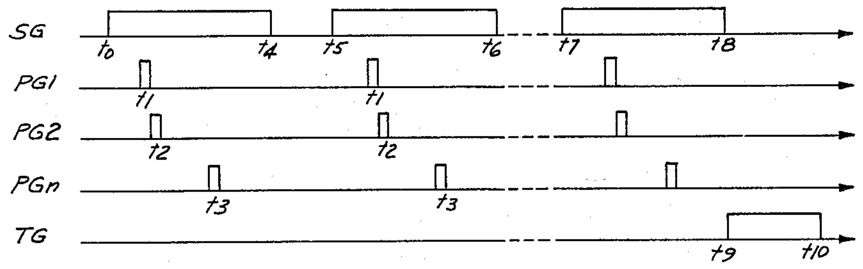
FIG. 3 shows a time diagram of the operation of the printer TS1–TS$n$.
Figure 5:
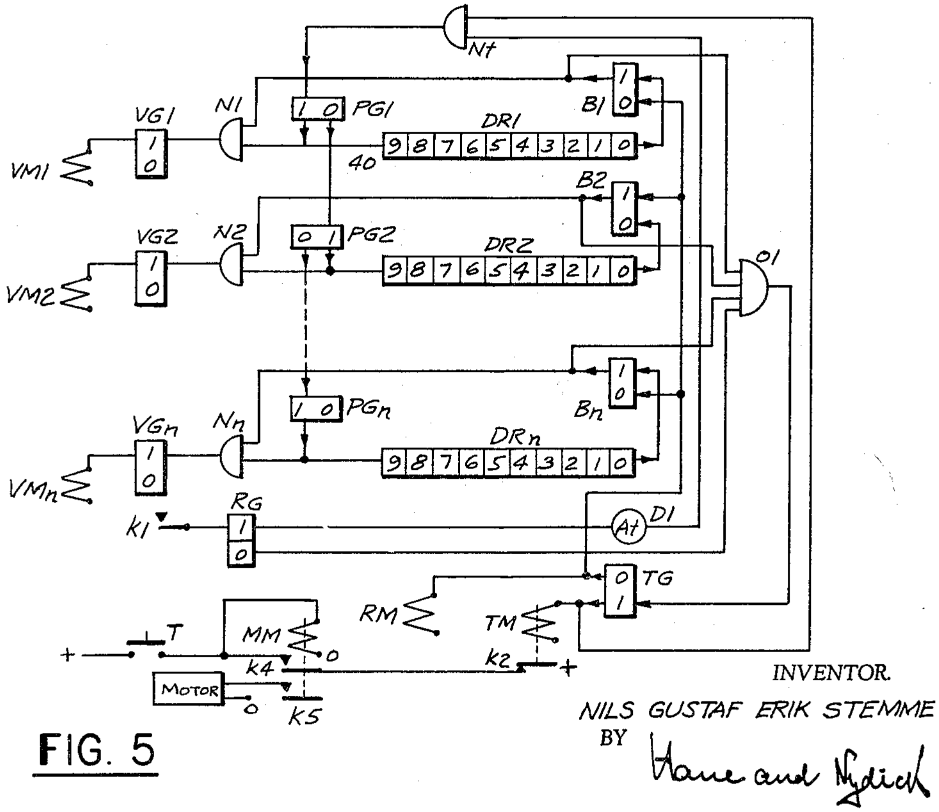
FIG. 5 shows the circuit diagram for controlling the printer of FIG. 4.
Figure 4:
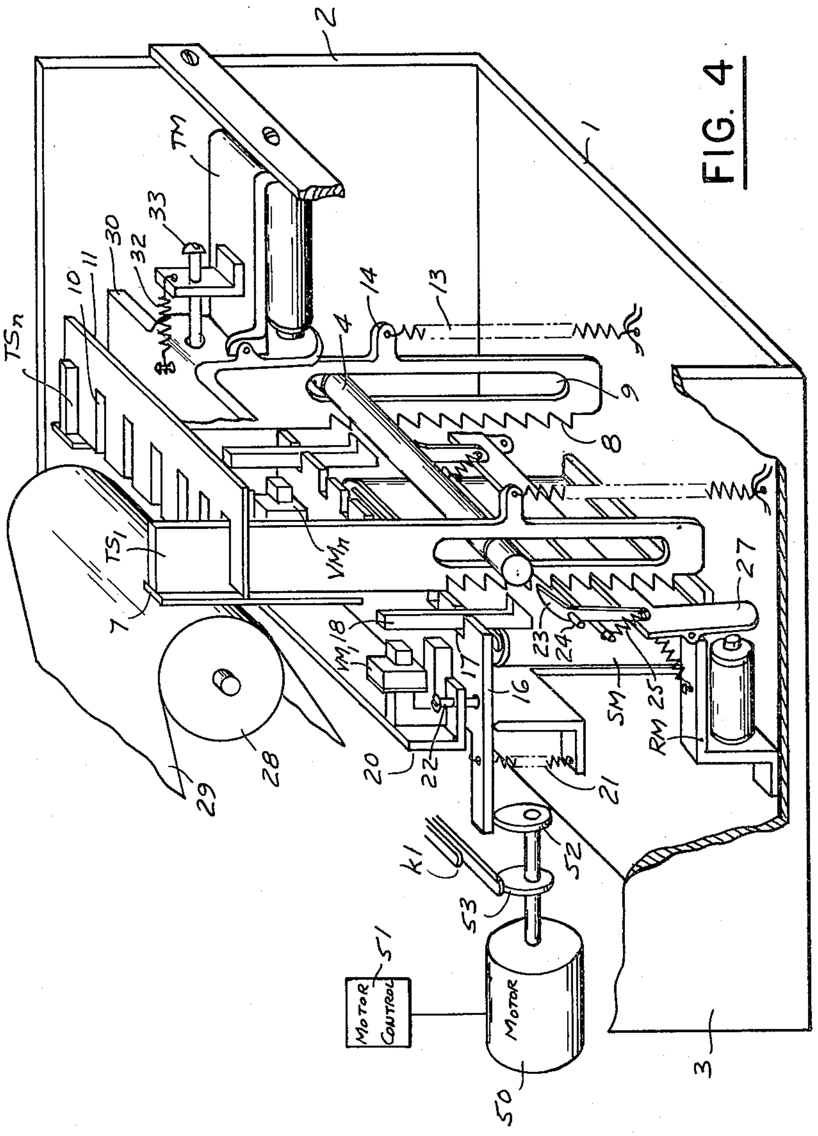
FIG. 4 shows a modification of the printer.

FIGS. 4 and 5 show a printer arrangement which affords the advantages of a more silent operation and avoids heavy and bulky magnets. To this end the reciprocatory movement of armature 16 is effected by a cam disk 52 driven by a motor 50. The camming surface of the disk is such that the armature remains in its second position for the time required by the selector magnets VM to attract their armatures. Since the armatures have a small mass, the time thus required is comparatively short—on the order of 10 milliseconds. The shaft of motor 50 seats a second cam disk 53 actuating a contact arm $k1$ connected as shown in FIG. 5. When the starter key T is depressed, relay coil MM is energized and closes the motor control contact $k3$ and a holding contact $k4$. The motor starts and continues to rotate, relay MM being energized by the holding current through contacts $k4$ and $k2$. Each time cam disk 53 closes contact $k1$, a monostable multivibrator RG is started, generating a pulse having the same shape as pulse SG in FIG. 3. The remaining part of the operation for printing the information stored in the electronic register is similar to the operation previously described in connection with FIGS. 1, 2 and 3. When magnet TM is energized at the end of the printing operation upon energization of flip-flop TG, contact $k2$ is opened, causing the holding circuit for relay MM to be broken. As a result, the relay is de-energized and the motor is stopped. In this case the driving motor is suitably used for setting a main spring for the printing hammer 30 so that the printing magnet only has to perform the work required for triggering said main spring.

It is also possible to modify the embodiment described in other ways within the scope of the invention as set forth in the claims. For example it is not necessary that the decimal registers are cleared during the setting of the type bars but it is of course also possible to add a unit successively until the capacity of the decimal register is exceeded. Then a flip-flop circuit (corresponding to B1) is actuated and further operation of the selector magnets is prevented. The order of the types on the type plates 7 must be the reverse of that used when the decimal registers are counted to zero.

I claim:

1. A positioning device for printing type characters in row and column arrangement, said device comprising a plurality of type carriers each having a toothed portion, one for each column to be printed and each carrying a type of each character to be printed in the respective row, said type carriers being step-by-step movable to print a selected type in a selected row, support means for guiding a record carrier upon which type characters are to be printed, hammer means movable between a rest position and an active position and coacting with said type carriers for pressing the same against the record carrier guided on said support means, stepping means controlling the positions of said type carriers for moving the same by one step in response to an energization of the stepping means, said stepping means including a movable arm for each type carrier, a pawl for each type carrier coacting with the respective arm for movement of the pawl by said arm, and electromagnetic means for actuating said arm by a change in the state of energization of the electromagnetic means, each of said pawls being engageable with the toothed portion of the respective type carrier to move the latter by one step when the respective arm is moved, each of said arms constituting an armature of the respective electromagnetic means, electronic register means for controlling said stepping means and said hammer means, said register means having one register position for each position of each type carrier, and coincidence circuit means for energizing the register means in a predetermined register position to move the hammer means from the rest position to the active position, thereby effecting printing of the respective type character.

2. A positioning device for printing type characters in row and column arrangement, said device comprising a plurality of type carriers each having a toothed portion, one for each column to be printed and each carrying a type of each character to be printed in the respective row, said type carriers being step-by-step movable to print a selected type in a selected row, support means for guiding a record carrier upon which type characters are to be printed, hammer means movable between a rest position and an active position and coacting with said type carriers for pressing the same against the record carrier guided on said support means, stepping means controlling the positions of said type carriers for moving the same by one step in response to an energization of the stepping means, said stepping means including a movable arm for each type carrier, a pawl for each type carrier coacting with the respective arm for movement of the pawl by said arm, a cam disk for each arm to move the same, and rotary drive means for rotating said cam disks, each of said pawls being engageable with the toothed portion of the respective type carrier to move the latter by one step when the respective arm is moved, electronic register means for controlling said stepping means and said hammer means, said register means having one register position for each position of each type carrier, and coincidence circuit means for energizing the register means in a predetermined register position to move the hammer means from the rest position to the active position, thereby effecting printing of the respective type character.

3. A positioning device for printing type characters in row and column arrangement, said device comprising a plurality of type carriers each having a toothed portion, one for each column to be printed and each carrying a type of each character to be printed in the respective row, said type carriers being step-by-step movable to print a selected type in a selected row, support means for guiding a record carrier upon which type characters are to be printed, hammer means movable between a rest position and an active position and coacting with said type carriers for pressing the same against the record carrier guided on said support means, stepping means controlling the positions of said type carriers for moving the same by one step in response to an energization of the stepping means, said stepping means including a movable arm for each type carrier, a pawl for each type carrier coacting with the respective arm for movement of the pawl by said arm, electromagnetic means for actuating said arm by a change in the state of energization of the electromagnetic means, each of said pawls being engageable with the toothed portion of the respective type carrier to move the latter by one step when the respective arm is moved, bias means for biasing all the type carriers toward an initial position, detent means engageable with the toothed portions of the carriers to prevent movement of the carriers into said initial positions by the action of said biasing means during setting of the type carriers by said pawls and operation of said hammer means, release means for releasing said detent means from the type carriers, said releasing means being controlled by said hammer means returning into the rest position, electronic register means for controlling said stepping means and said hammer means, said register means having one register position for each position of each type carrier, and coincidence circuit means for energizing the register means in a predetermined register position to move the hammer means from the rest position to the active position, thereby effecting printing of the respective type character.

References Cited in the file of this patent

UNITED STATES PATENTS

| | | |
|---|---|---|
| 2,416,625 | Hooper | Feb. 25, 1947 |
| 2,638,542 | Fleming | May 12, 1953 |
| 2,720,832 | Luning | Oct. 18, 1955 |
| 2,776,618 | Hartley | Jan. 8, 1957 |
| 2,824,513 | Johnson et al. | Feb. 25, 1958 |
| 2,964,739 | Dirks | Dec. 13, 1960 |